United States Patent
Gonze et al.

(10) Patent No.: US 8,112,990 B2
(45) Date of Patent: Feb. 14, 2012

(54) LOW EXHAUST TEMPERATURE ELECTRICALLY HEATED PARTICULATE MATTER FILTER SYSTEM

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC, Detroit, MI (US)

(*) Notice: Subject to any disclaimer, the term of this patent is extended or adjusted under 35 U.S.C. 154(b) by 646 days.

(21) Appl. No.: 12/174,069

(22) Filed: Jul. 16, 2008

(65) Prior Publication Data

US 2009/0071128 A1    Mar. 19, 2009

Related U.S. Application Data

(60) Provisional application No. 60/972,322, filed on Sep. 14, 2007.

(51) Int. Cl.
*F01N 3/10* (2006.01)
(52) U.S. Cl. ............... 60/300; 60/274; 60/286; 60/303; 60/311
(58) Field of Classification Search .............. 60/274, 60/284–287, 295–301
See application file for complete search history.

(56) References Cited

U.S. PATENT DOCUMENTS

| | | | |
|---|---|---|---|
| 4,427,418 A * | 1/1984 | Kogiso et al. ............ | 55/287 |
| 4,456,457 A * | 6/1984 | Nozawa et al. ........... | 55/283 |
| 4,505,107 A * | 3/1985 | Yamaguchi et al. ....... | 60/303 |
| 4,505,726 A * | 3/1985 | Takeuchi et al. | |
| 4,516,993 A * | 5/1985 | Takeuchi et al. ......... | 55/283 |
| 4,548,625 A * | 10/1985 | Ishida et al. ............ | 55/282 |
| 4,549,398 A * | 10/1985 | Oishi et al. ............ | 60/286 |
| 4,872,889 A | 10/1989 | Lepperhoff et al. | |
| 4,974,414 A | 12/1990 | Kono et al. | |
| 5,144,798 A * | 9/1992 | Kojima et al. ........... | 60/303 |
| 5,171,335 A * | 12/1992 | Kojima et al. ........... | 55/523 |
| 5,319,930 A * | 6/1994 | Shinzawa et al. ......... | 60/286 |
| 5,716,586 A * | 2/1998 | Taniguchi ............. | 422/173 |
| 6,090,172 A * | 7/2000 | Dementhon et al. ...... | 55/282.3 |
| 6,176,896 B1 * | 1/2001 | Dementhon et al. ...... | 95/14 |
| 6,871,489 B2 * | 3/2005 | Tumati et al. .......... | 60/285 |
| 7,104,051 B2 * | 9/2006 | Shimasaki et al. ....... | 60/297 |
| 7,332,016 B2 * | 2/2008 | Costura et al. ......... | 95/20 |
| 2007/0062181 A1 * | 3/2007 | Williamson et al. ...... | 60/297 |
| 2008/0134669 A1 * | 6/2008 | Lange .................. | 60/295 |

FOREIGN PATENT DOCUMENTS

| | | |
|---|---|---|
| DE | 3712333 A1 | 10/1988 |
| DE | 3890556 C2 | 1/1993 |
| JP | 3168314 A | 7/1991 |

* cited by examiner

*Primary Examiner* — Thomas Denion
*Assistant Examiner* — Jesse Bogue

(57) ABSTRACT

A system includes a particulate matter (PM) filter, a sensor, a heating element, and a control module. The PM filter includes with an upstream end that receives exhaust gas, a downstream end and multiple zones. The sensor detects a temperature of the exhaust gas. The control module controls current to the heating element to convection heat one of the zones and initiate a regeneration process. The control module selectively increases current to the heating element relative to a reference regeneration current level when the temperature is less than a predetermined temperature.

22 Claims, 8 Drawing Sheets

LOW EXHAUST TEMPERATURE ELECTRICALLY HEATED PARTICULATE MATTER FILTER SYSTEM

CROSS-REFERENCE TO RELATED APPLICATIONS

This application claims the benefit of U.S. Provisional Application No. 60/972,322 filed on Sep. 14, 2007. The disclosure of the above application is incorporated herein by reference.

STATEMENT OF GOVERNMENT RIGHTS

The disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to electrically heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

In one embodiment, a system is provided that includes a particulate matter (PM) filter, a sensor, a heating element, and a control module. The PM filter includes an upstream end that receives exhaust gas, a downstream end and multiple zones. The sensor detects a temperature of the exhaust gas. The control module controls current to the heating element to convection heat one of the zones and initiate a regeneration process. The control module selectively increases current to the heating element relative to a reference regeneration current level when the temperature is less than a predetermined temperature.

In other features, a method includes providing a particulate matter (PM) filter that includes an upstream end that receives exhaust gas, a downstream end and multiple zones. A temperature of the exhaust gas is detected. Current to a heating element is controlled to convection heat one of the zones and initiate a regeneration process. Current to the heating element is selectively increased relative to a reference regeneration current level when the temperature is less than a predetermined temperature.

In still other features, a system includes a PM filter, a sensor, a heating element, and a control module. The PM filter includes an upstream end that receives exhaust gas, a downstream end and multiple zones. The sensor detects an exhaust gas temperature of the exhaust gas. The control module selectively activates and adjusts output of the heating element to convection heat one of the zones and initiate a regeneration process. The control module selectively adjusts operation of the heating element to increase temperature of a portion of the upstream end to a regeneration temperature level that supports combustion propagation along the PM filter from the upstream end to the downstream end when the exhaust gas temperature is less than a predetermined temperature.

In yet features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

DRAWINGS

The drawings described herein are for illustration purposes only and are not intended to limit the scope of the present disclosure in any way.

DETAILED DESCRIPTION

Figure 1:
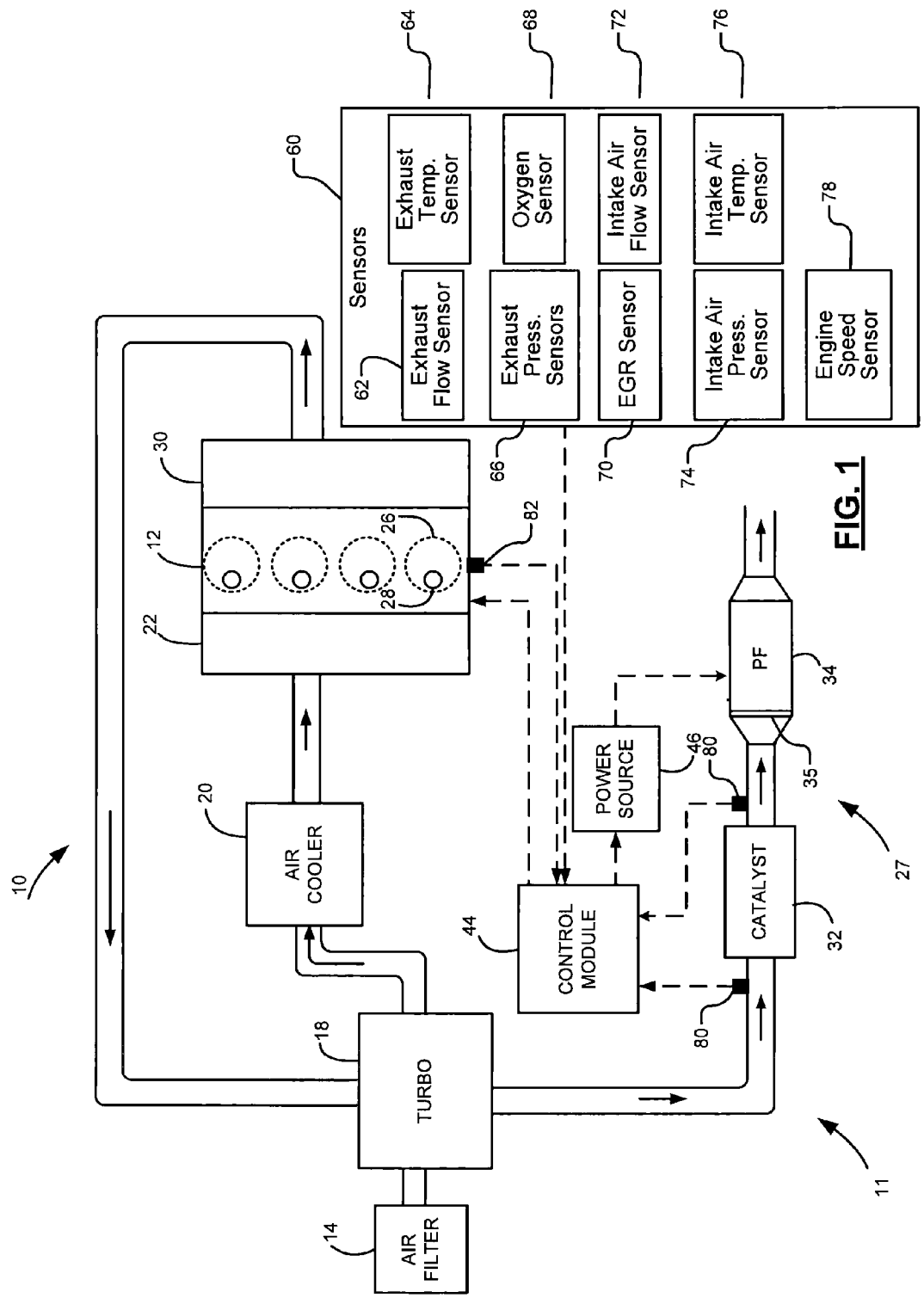
FIG. 1 is a functional block diagram of an exemplary engine including a particulate matter (PM) filter with a zoned inlet heater that is spaced from the PM filter.

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system 11 described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system 27.

The exhaust system 27 includes an exhaust manifold 30, a diesel oxidation catalyst (DOC) 32, and a particulate matter (PM) filter assembly 34 with a zoned inlet heater 35. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the zoned heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The zoned inlet heater 35 is spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the temperature of exhaust gas from the engine 12 is less than a predetermined level and when the estimated loading is at a predetermined level and/or when the exhaust flow rate is within a desired range, current is controlled to the PM filter assembly 34 via a power source 46 to initiate the regeneration process. The duration of the regeneration process may be varied based upon the estimated amount of particulate matter within the PM filter assembly 34.

Current is applied to the zoned heater 35 during the regeneration process. More specifically, the energy heats selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection. The remainder of the regeneration process is achieved using the heat generated by the heated exhaust passing through the PM filter.

The above system may include various sensors 60. The sensors 60 may be used to determine exhaust flow levels, exhaust temperature levels, exhaust pressure levels, oxygen levels, intake air flow rates, intake air pressure, intake air temperature, engine speed, EGR information, etc. An exhaust flow sensor 62, an exhaust temperature sensor 64, exhaust pressure sensors 66, oxygen sensor 68, an EGR sensor 70, an intake air flow sensor 72, an intake air pressure sensor 74, an intake air temperature sensor 76, and an engine speed sensor 78 are shown. Sensors 80 may be exhaust temperature and/or pressure sensors. Sensor 82 may be an engine speed sensor.

Figure 2:
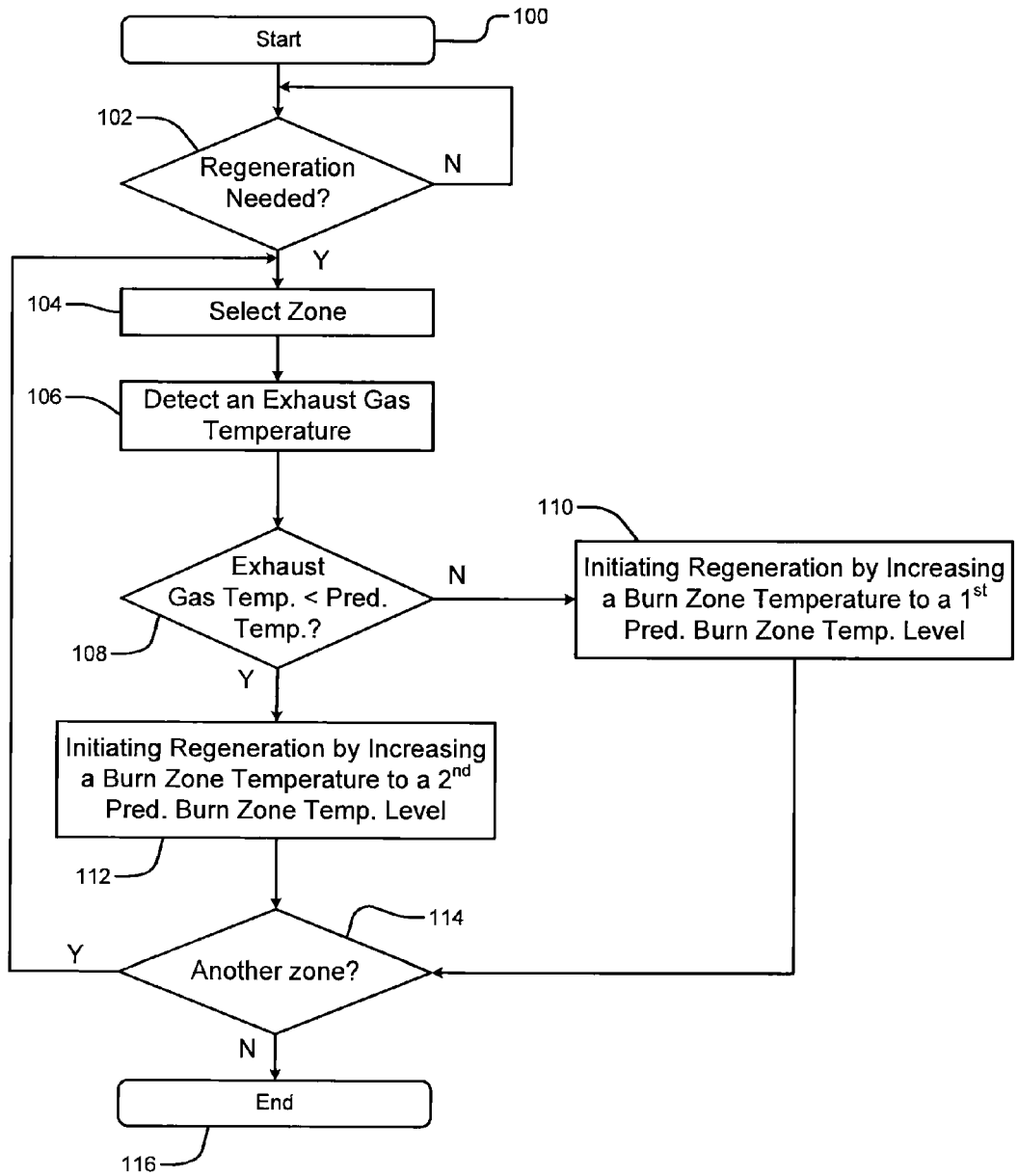
FIG. 2 is a flowchart illustrating a PM filter regeneration method in accordance with an embodiment of the present disclosure.

Referring now to FIG. 2, a logic flow diagram illustrating a PM filter regeneration method is shown.

In one embodiment, regeneration of the PM filter is performed without assistance from the associated engine. In other words, air flow, oxygen levels, fuel injection, and exhaust gas recirculation (EGR) are not adjusted to assist the regeneration process.

During an electrically heated PM filter mode, the current supplied to heater (heating element(s)) is adjusted to provide a heating temperature that is based on soot loading, oxygen levels in the exhaust, exhaust temperatures, exhaust flow, etc. Voltage and/or ON time of the heater (heater element(s)) may be adjusted in addition to or as an alternative to the adjustment of current. A look-up table may be used to provide the appropriate heater current, voltage and/or ON time levels.

When temperature of an input portion of a PM filter associated with a selected zone ("burn zone") is below a temperature for proper regeneration, the heater element current is increased. This increases heating element temperatures and thus the input temperature of the burn zone. The temperature of the heating element and/or the input portion may increase above a predetermined peak PM filter operating temperature.

A PM filter may have a predetermined peak operating temperature, which may be based on a current temperature of an exhaust or an exhaust gas in an exhaust system. The peak operating temperature may be associated with a point of potential PM filter degradation. For example, a PM filter may begin to breakdown at operating temperatures greater than 800° C. when exhaust temperatures are greater than approximately 300° C. The peak operating temperature may vary for different PM filters. The peak operating temperature may be associated with an average temperature of a portion of the PM filter or an average temperature of the PM filter as a whole.

In step 100, control begins and proceeds to step 102. In step 102, control determines if regeneration is needed. If regeneration is needed control proceeds to step 104.

In step 104, control may select one or more zones for regeneration. In step 106, control determines temperature of an exhaust or of an exhaust gas. One or more of the temperature sensors described above may be used to generate an exhaust gas temperature signal. The temperature signal may indicate temperature of an exhaust/exhaust gas upstream or downstream from a PM filter. The temperature signal may also or alternatively indicate temperature of the PM filter and/or exhaust gas within the PM filter.

In step 108, when the temperature(s) of step 106 are less than a predetermined temperature level, control proceeds to step 112, otherwise control proceeds to step 110. For example, when the exhaust gas temperature of an exhaust gas that is upstream from the PM filter is less than approximately 300° C., control proceeds to step 112.

In step 110, regeneration of the selected zone(s) is performed. This regeneration may include the increasing of a burn zone temperature for the selected zone(s) first predetermined burn zone temperature level. The regeneration may include steps 312-324 described below. The first predetermined burn zone temperature level may correspond with a first heating element output level, current level, voltage level and/or ON time level. The predetermined burn zone temperature level may also correspond with a reference regeneration output level, a reference regeneration current level, a reference regeneration voltage level, a reference regeneration ON time level, etc. For example only, the first predetermined burn zone temperature level may be approximately between 700°-900° C.

In step 112, regeneration of the selected zone(s) is performed. This regeneration may include the increasing of a burn zone temperature for the selected zone(s) to a second predetermined burn zone temperature level. The regeneration may include steps 312-324 described below. The second predetermined burn zone temperature level is greater than the first predetermined burn zone temperature level. The second predetermined burn zone temperature level may be provided by increasing current, voltage and/or ON time of the selected heating element(s) to levels greater than provided in step 110. For example only, the first predetermined burn zone temperature level may be approximately between 900°-1300° C.

The current, voltage and/or ON time levels of steps 110 and 112 may be set based on the temperature(s) of step 106, as well as information from other sensors, such as from the sensors 60 of FIG. 1. The current, voltage and/or ON time levels of steps 110 and 112 may also be set based on detected and/or predicted soot levels in the PM filter. The current, voltage and/or ON time levels are set to assure that combustion propagation travels from an upstream end to a downstream end of the PM filter and is not extinguished.

In step 114, control determines whether additional zones need to be regenerated. Control returns to step 104 when additional zones are to be regenerated. Otherwise control ends.

Figure 3:
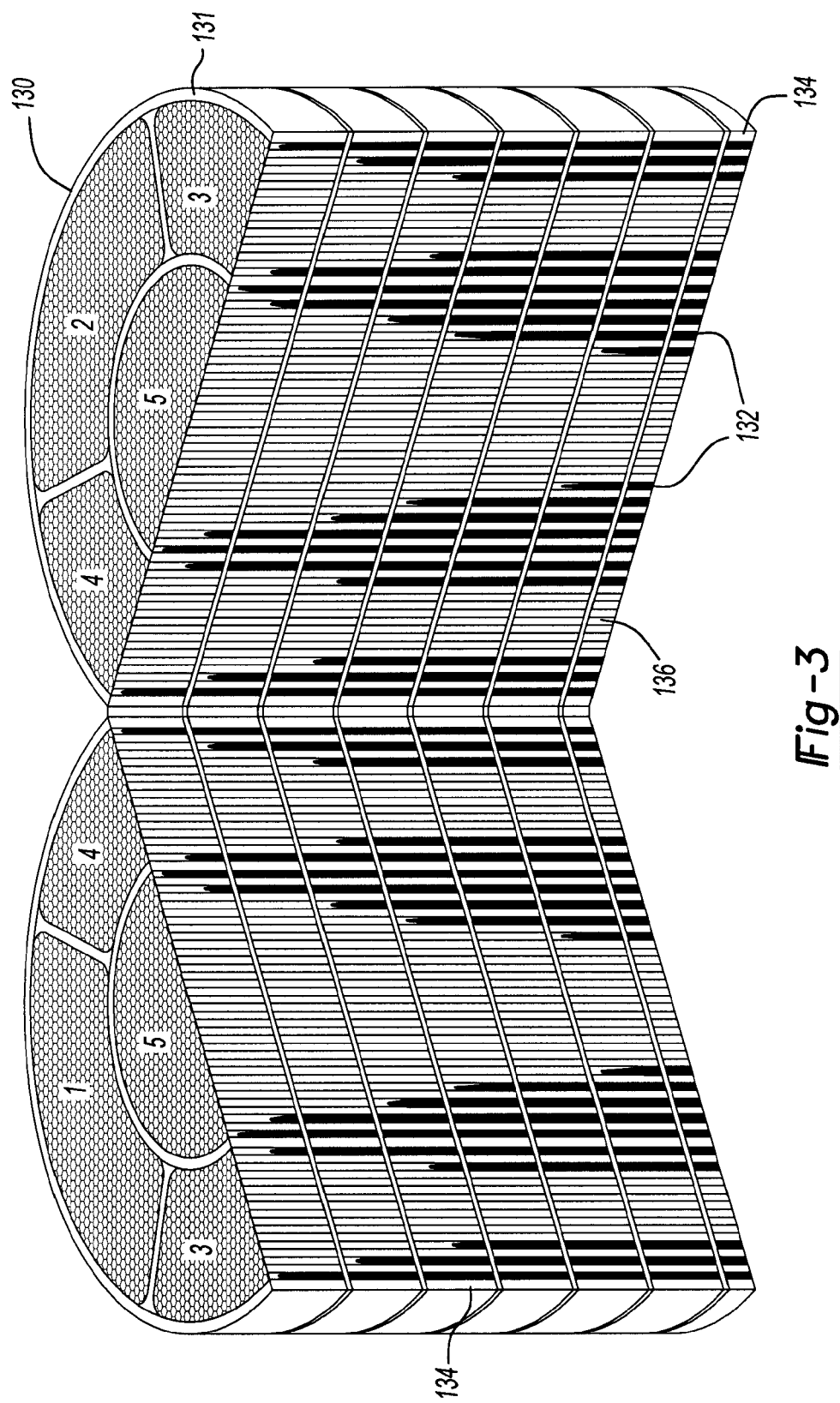
FIG. 3 illustrates a PM filter with incomplete regeneration due to cold exhaust temperatures.

Referring now to FIG. 3, a PM filter is shown with incomplete regeneration due to cold exhaust temperatures. When exhaust temperatures are less than or equal to approximately 300° C., the exothermic reaction in a PM filter during regeneration may become increasingly extinguished axially along the PM filter. Cold exhaust gas tends to collapse the thermal propagation wave as it propagates down the PM filter. When the exhaust temperature is too low, the heated area of the PM filter shrinks in size due to exposure of the outer edge of a combustion area of the propagation wave to cold exhaust gas.

It is common for a diesel engine to operate and provide exhaust temperatures of approximately between 150-300° C. Thus, should a regeneration process be initiated with a heating element temperature near or below a recommended peak operating temperature, the regeneration process may be incomplete. A substantial amount of soot within the PM filter may not be burned off, as shown in FIG. 3.

In FIG. 3, zones of a PM filter 130 are shown and labeled 1-5 on an input (upstream end) 131 of the PM filter 130. The PM filter of FIG. 3 is provided as an example to illustrate a result of an exothermic reaction being extinguished during a regeneration process. As an exothermic reaction propagates along a PM filter it may be extinguished due to low temperatures of an exhaust gas and/or PM filter and/or the lack of energy provided to initiate the exothermic reaction. The dark areas 132 of the cross-sectional sides 134 of the PM filter 130 represent the remaining soot in the PM filter 130. The remaining soot is a result of an exothermic reaction being extinguished during a regeneration process. The amount of soot remaining increases towards the output (downstream end) 136 of the PM filter 130.

To improve regeneration, when exhaust temperatures are approximately 300° C. or less, heating element current, voltage and/or ON time is adjusted to increase temperature of a portion of an upstream end of a PM filter above a normal predetermined peak operating temperature. The normal predetermined peak operating temperature may refer to a peak operating temperature of the PM filter as a whole.

The heating element temperatures are increased such that soot combustion robustly propagates down the length of the PM filter without being extinguished. The combustion temperature is increased enough such that the flamefront propagates down the PM filter channels without affecting size of the heated area of the flamefront. In one embodiment, the heating element temperatures are increased for one or more zones or portions (pieces) of one or more zones above a peak operating temperature. The peak operating temperature is a recommended overall peak operating temperature for the PM filter. Thus, although the peak operating temperature for a portion of the PM filter is above the recommended peak operating temperature, the average overall temperature across the PM filter is less than the peak operating temperature. For this reason, the internal expansion pressures within the PM filter do not exceed a pressure threshold associated with potential PM filter degradation.

The temperature of the heating elements associated with the heated zone(s) or zone portion(s) may be increased to approximately 900-1300° C. In one embodiment, the heating element temperatures are increased to approximately between 1000-1200° C. This increase may be performed without any engine assistance or air flow, oxygen level, fuel injection, and exhaust gas recirculation (EGR) adjustment. However, engine assistance may be performed depending upon the situation.

The heating element temperatures may be increased based on soot loading, oxygen levels in the exhaust, exhaust temperatures, exhaust flow, etc. As an example, when a high air flow rate is present, heater current may increase, since less heat is resident to the input of a PM filter. A look-up table may be used to provide the appropriate heater current level and/or heater current level increase. The current levels may be different depending upon the zone, the zone portion, the number of zones or zone portions, and the location and relative positioning thereof.

In one embodiment, regeneration is performed one zone at a time. In another embodiment, regeneration is performed for multiple zone portions. In yet another embodiment, the total heated area during any one regeneration process of a PM filter is approximately 20%±5% of the front input cross-sectional area of the PM filter. Thus, regeneration may be performed approximately five times to remove soot from all of the zones of the PM filter 130. In still another embodiment, outside zones along a perimeter of a PM filter are regenerated prior to regeneration of internal zones.

The amount of fuel consumption associated with the above-described regeneration process is negligible or approximately zero. This approach leverages soot energy to regenerate a PM filter. Regeneration time is minimal due to soot oxidation rates at high temperatures.

Figure 4:
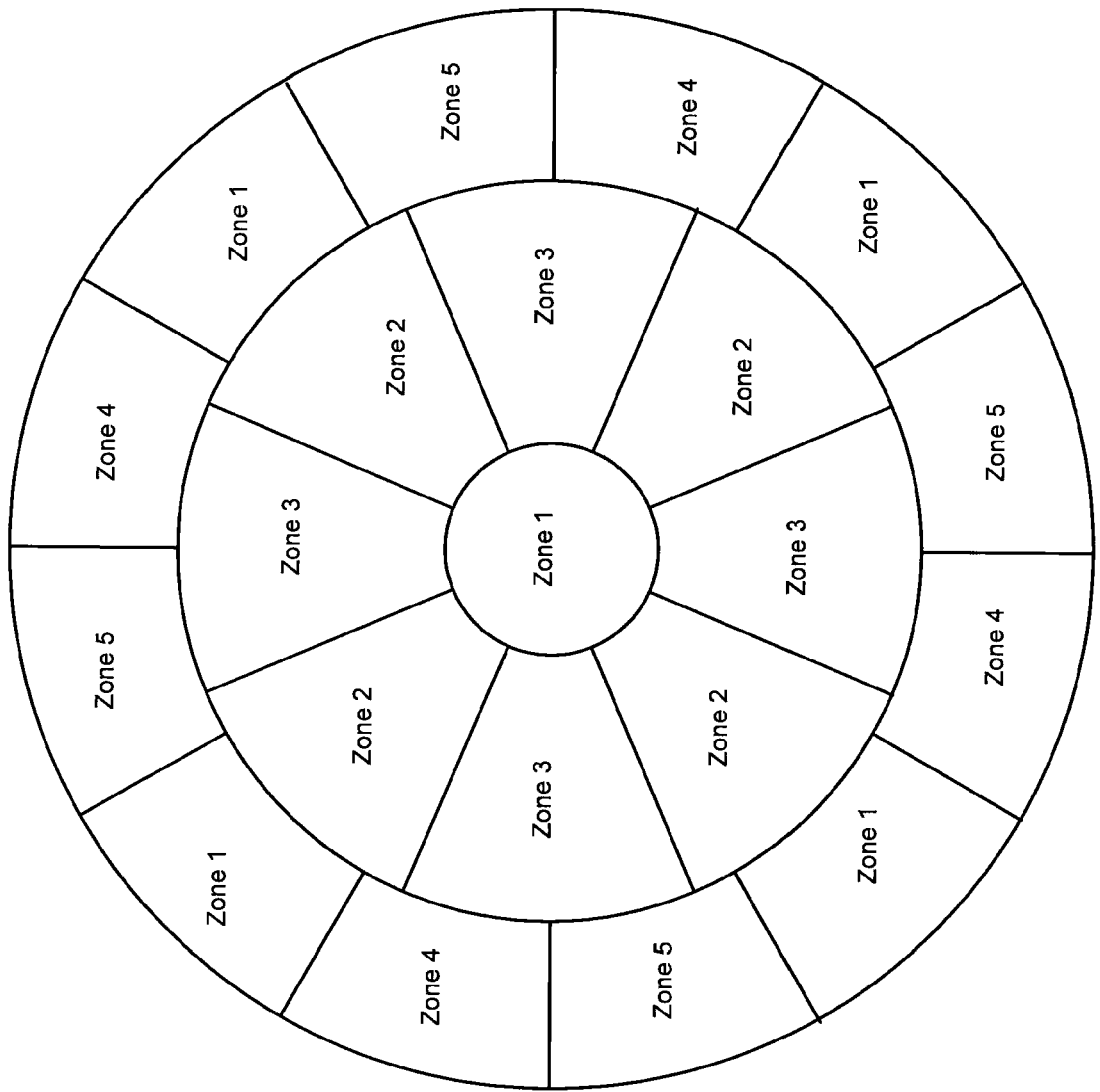
FIG. 4 illustrates exemplary zoning of the zoned inlet heater of the electrically heated PM filter of FIG. 1 in further detail.

Referring now to FIG. 4, another exemplary zoned inlet heater arrangement is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

The electrical heater may be spaced from the PM filter. In other words, the electric heater may be located in front of the PM filter but not in contact with the downstream PM filter. The heater selectively heats portions of the PM filter. The PM filter may be mounted close enough to the front of the PM filter to control the heating pattern. The length of the heater is set to optimize the exhaust gas temperature.

Thermal energy is transmitted from the heater to the PM filter by the exhaust gas. Therefore the PM filter is predominately heated by convection. The electrical heater is divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter is regenerated by selectively heating one or more of the zones in the front of the PM filter and igniting the soot using the heated exhaust gas. When a sufficient face temperature is reached, the heater is turned off and the burning soot then cascades down the length of the PM filter channel, which is similar to a burning fuse on a firework. In other words, the heater may be activated only long enough to start the soot ignition and is then shut off. Other regeneration systems typically use both conduction and convection and maintain power to the heater (at lower temperatures such as 600 degrees Celsius) throughout the soot burning process. As a result, these systems tend to use more power than the system proposed in the present disclosure.

The burning soot is the fuel that continues the regeneration. This process is continued for each heating zone until the PM filter is completely regenerated.

The heater zones are spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

Figure 5:
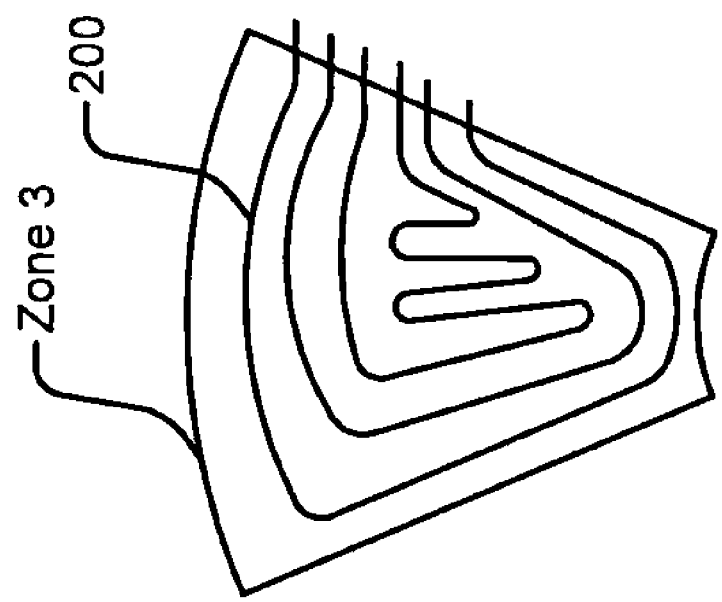
FIG. 5 illustrates an exemplary resistive heater in one of the zones of the zoned inlet heater of FIG. 3.

Referring now to FIG. 5, an exemplary resistive heater 200 arranged adjacent to one of the zones (e.g. zone 3) from the first circumferential band of zones in FIG. 3 is shown. The resistive heater 200 may comprise one or more coils that cover the respective zone to provide sufficient heating.

Figure 6:
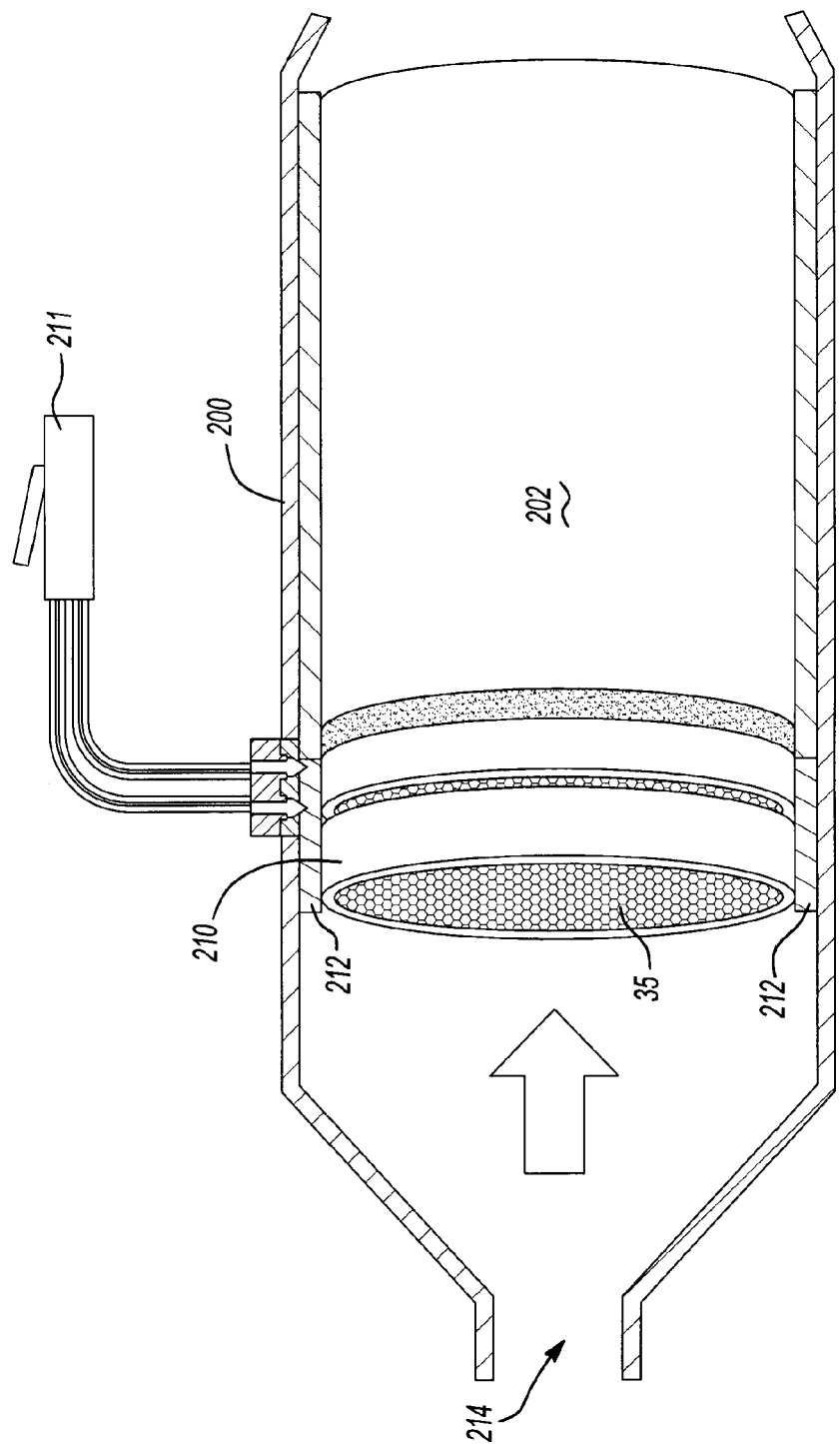
FIG. 6 illustrates the electrically heated PM filter having a zoned electric heater that is spaced from the PM filter.

Referring now to FIG. 6, the PM filter assembly 34 is shown in further detail. The PM filter assembly 34 includes a housing 200, a filter 202, and the zoned heater 35. The heater 35 may be arranged between a laminar flow element 210 and a substrate of the filter 202. For PM filters with an end plug near the input of the PM filter, the heating element temperatures of the heater 35 are increased to increase temperatures of the PM filter downstream from the end plug. This allows thermal energy to propagate down the PM filter walls and/or channels. An electrical connector 211 may provide current to the zones of the PM filter assembly 34 as described above.

As can be appreciated, the heater 35 may be spaced from the filter 202 such that the heating is predominantly convection heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas travels a distance and is received by the filter 202. The heater 35 may be spaced from and not in contact with the filter 202.

Figure 7:
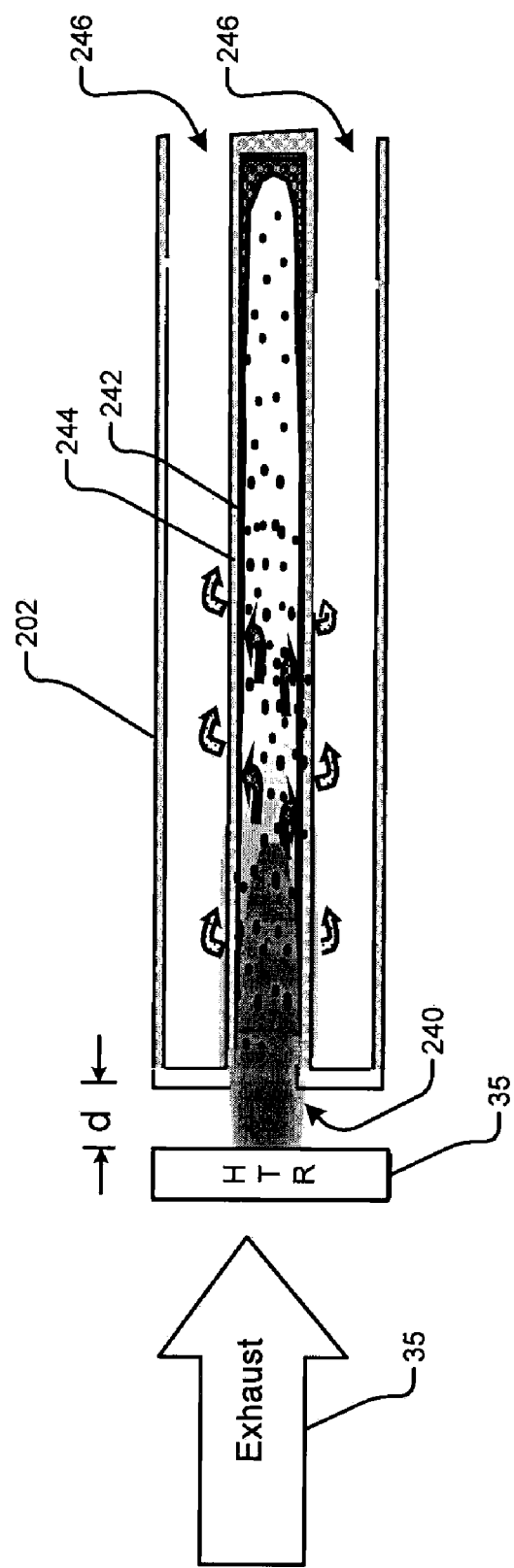
FIG. 7 illustrates heating within a zoned electric heater.

Referring now to FIG. 7, heating within the PM filter assembly 34 is shown in further detail. Exhaust gas 250 passes through the heater 35 and is heated by one or more zones of the heater 35. The heated exhaust gas travels a distance "d" and is then received by the filter 202. The distance "d" may be ½" or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection to ignite a front portion of the filter 202. When the soot in the front face portions reaches a sufficiently high temperature, the heater is turned off. Combustion of soot then cascades down a filter channel 254 without requiring power to be maintained to the heater.

Figure 8:
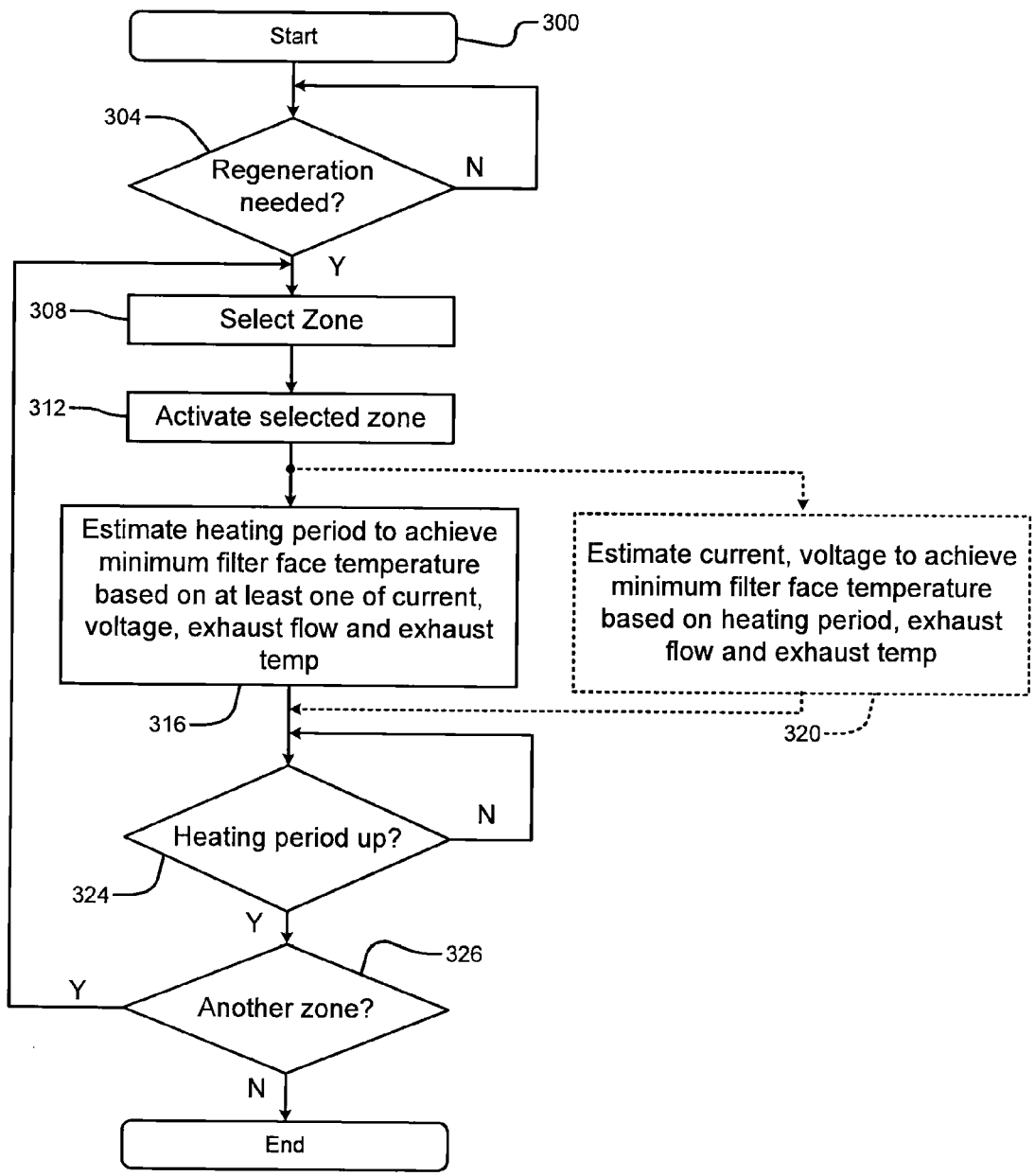
FIG. 8 is a flowchart illustrating steps performed by the control module to regenerate the PM filter.

Referring now to FIG. 8, steps for regenerating the PM filter are shown. In step 300, control begins and proceeds to step 304. If control determines that regeneration is needed in step 304, control selects one or more zones in step 308 and activates the heater for the selected zone in step 312. In step 316, control estimates a heating period (PM filter ON time) sufficient to achieve a minimum filter face temperature based on at least one of current of PM filter heating element(s), voltage of PM filter heating element(s), exhaust flow, exhaust temperature, etc. The minimum face temperature should be sufficient to start the soot burning and to create a cascade effect. For example only, the minimum face temperature may be set to 700 degrees Celsius or greater. In an alternate step 320 to step 316, control estimates current and voltage needed to achieve minimum filter face temperature based on a predetermined heating period, exhaust flow and exhaust temperature.

In step 324, control determines whether the heating period is up. If step 324 is true, control determines whether additional zones need to be regenerated in step 326. If step 326 is true, control returns to step 308. Otherwise control ends.

The above-described steps of FIGS. 2 and 8 are meant to be illustrative examples; the steps may be performed sequentially, synchronously, simultaneously, continuously, during overlapping time periods or in a different order depending upon the application.

In use, the control module determines when the PM filter requires regeneration. Alternately, regeneration can be performed periodically or on an event basis. The control module may estimate when the entire PM filter needs regeneration or when zones within the PM filter need regeneration. When the control module determines that the entire PM filter needs regeneration, the control module sequentially activates one or more of the zones at a time to initiate regeneration within the associated downstream portion of the PM filter. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

The present disclosure may substantially reduce the fuel economy penalty, decrease tailpipe temperatures, and improve system robustness due to the smaller regeneration time.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a particulate matter (PM) filter comprises an upstream end that receives exhaust gas, a downstream end and a plurality of zones;
    a sensor that detects a temperature of said exhaust gas;
    a heating element; and
    a control module that controls current to said heating element to convection heat one of said plurality of zones and initiate a regeneration process,
    wherein said control module selectively increases current to said heating element relative to a reference regeneration current level when said temperature is less than a predetermined temperature,
    wherein said control module increases said current to said heating element to increase a temperature of a portion of said upstream end to a regeneration temperature level, wherein said regeneration temperature level supports combustion propagation along said PM filter from said upstream end to said downstream end,
    wherein said regeneration temperature level is greater than a maximum operating temperature of said PM filter, and wherein said maximum operating temperature is greater than or equal to an average overall temperature across said PM filter at which degradation of said PM filter begins.

2. The system of claim 1, comprising a plurality of heating elements, wherein said control module selectively:
    activates one of said plurality of heating elements to convection heat one of said plurality of zones; and
    refrains from activating others of said plurality of heating elements while said one of said plurality of heating elements is activated.

3. The system of claim 1, wherein said heating element is spaced a predetermined distance upstream from said upstream end.

4. The system of claim 1, wherein said control module decreases current to said heating element when said temperature of said exhaust gas exceeds a threshold.

5. The system of claim 1, wherein said control module supports said regeneration process by adjusting said current and activation ON time of said heating element and without adjusting exhaust gas flow, engine intake airflow, fuel injection operation, and exhaust gas recirculation.

6. The system of claim 1, wherein:
    said heating element is deactivated when temperature of said portion is equal to said regeneration temperature level; and
    said regeneration temperature level supports combustion propagation along said PM filter from said upstream end to said downstream end while said heating element is deactivated.

7. The system of claim 1, wherein said control module sets said current at a first level when said temperature of said exhaust gas is greater than said predetermined temperature and increases said current to a second level when said temperature of said exhaust gas is less than said predetermined temperature, and
    wherein said first level corresponds with said reference regeneration current level.

8. The system of claim 1, wherein said control module increases said current to a predetermined current level based on said temperature of said exhaust gas.

9. The system of claim 1, wherein said control module determines a heating period to heat a portion of said upstream end to a minimum filter face temperature, and
    wherein said control module activates said heating element for said heating period.

10. The system of claim 9, wherein said heating period is determined based on at least one of exhaust flow and said temperature of said exhaust gas.

11. The system of claim 1, wherein said control module adjusts said current based on a soot level of said PM filter, an exhaust flow level, and an oxygen level.

12. The system of claim 1, wherein said control module increases said temperature of said portion of said upstream end to a temperature between 1000-1300° C.

13. The system of claim 1, wherein said control module deactivates said heating element upon said temperature of said portion of said upstream end being equal to said regeneration temperature level to regenerate said one of said plurality of zones via combustion propagation.

14. The system of claim 1, wherein said maximum operating temperature of said PM filter is based on said temperature of said exhaust gas.

15. The system of claim 1, wherein expansion pressures within said PM filter exceed a threshold associated with degradation of said PM filter when an average or overall temperature of said PM filter is greater than or equal to said maximum operating temperature.

16. The system of claim 1, wherein an average overall operating temperature across said PM filter is less than said maximum operating temperature while said heating element is at said maximum operating temperature.

17. The system of claim 2, wherein each of said plurality of heating elements heats a respective one of said plurality of zones more than other ones of said plurality of zones.

18. A method comprising:
    providing a particulate matter (PM) filter that comprises an upstream end that receives exhaust gas, a downstream end and a plurality of zones;
    detecting a temperature of said exhaust gas;
    controlling current to a heating element to convection heat one of said plurality of zones and initiate a regeneration process; and
    selectively increasing current to said heating element relative to a reference regeneration current level when said temperature of said exhaust gas is less than a predetermined temperature,
    wherein said current is selectively increased to increase a temperature of a portion of said upstream end to a regeneration temperature level, wherein said regeneration temperature level supports combustion propagation along said PM filter from said upstream end to said downstream end, wherein said regeneration temperature level is greater than a maximum operating temperature of said PM filter, and wherein said maximum operating temperature is greater than or equal to an average overall temperature across said PM filter at which degradation of said PM filter begins based on at least one of a flow rate of said exhaust gas and said temperature of said exhaust gas.

19. The method of claim 18, comprising:

setting said current at a first level when said temperature of said exhaust gas is greater than said predetermined temperature; and increasing said current to a second level when said temperature of said exhaust gas is less than said predetermined temperature, wherein said first level corresponds with said reference regeneration current level.

20. A system comprising:

a particulate matter (PM) filter comprises an upstream end that receives exhaust gas, a downstream end and a plurality of zones;

a sensor that detects a temperature of said exhaust gas;

a heating element; and a control module that selectively activates and adjusts output of said heating element to convection heat one of said plurality of zones and initiate a regeneration process, wherein said control module selectively adjusts operation of said heating element to increase a temperature of a portion of said upstream end to a regeneration temperature level that supports combustion propagation along said PM filter from said upstream end to said downstream end when said temperature of said exhaust gas is less than a predetermined temperature, wherein said regeneration temperature level is greater than a maximum operating temperature of said PM filter, and wherein said maximum operating temperature is greater than or equal to an average overall temperature across said PM filter at which degradation of said PM filter begins.

21. The system of claim 20, wherein said control module when adjusting said operation of said heating element increases at least one of current, voltage and ON time of said heating element.

22. The system of claim 20, wherein said control module sets said output at a first level when said temperature of said exhaust gas is greater than said predetermined temperature and increases said output to a second level when said temperature of said exhaust gas is less than said predetermined temperature.

* * * * *